No. 706,847. Patented Aug. 12, 1902.
H. A. F. PETERSEN.
HOSE OR PIPE COUPLING.
(Application filed Apr. 10, 1902.)
(No Model.)

WITNESSES:
Gustave Dieterich.
Edwin N. Dieterich.

INVENTOR
Henry A. F. Petersen
BY
Conrad Augustus Walench
his ATTORNEY

UNITED STATES PATENT OFFICE.

HENRY A. F. PETERSEN, OF NEW YORK, N. Y.

HOSE OR PIPE COUPLING.

SPECIFICATION forming part of Letters Patent No. 706,847, dated August 12, 1902.

Application filed April 10, 1902. Serial No. 102,247. (No model.)

*To all whom it may concern:*

Be it known that I, HENRY A. F. PETERSEN, a citizen of the United States, residing at the city of New York, in the borough of the Bronx, in the county and State of New York, have invented certain new and useful Improvements in Pipe or Hose Couplings, of which the following is a full, clear, and exact specification.

My invention relates to means for uniting the ends of hose or soft-metal pipes of any kind; and said invention has for its object more particularly to provide a simple, reliable, and inexpensive apparatus which is so constructed that the same may be readily and easily applied to the opposing ends of the hose or pipe to be united when it is desired to add additional lengths to said hose or pipe or to repair a break therein without requiring any preliminary setting together of its parts or calling for the use of tools in order to apply said apparatus to effect a temporary or permanent union of the parts.

To these ends the invention consists in the novel details of construction and in the combination, connection, and arrangement of parts hereinafter more fully described and then pointed out in the claims.

Figure 1:
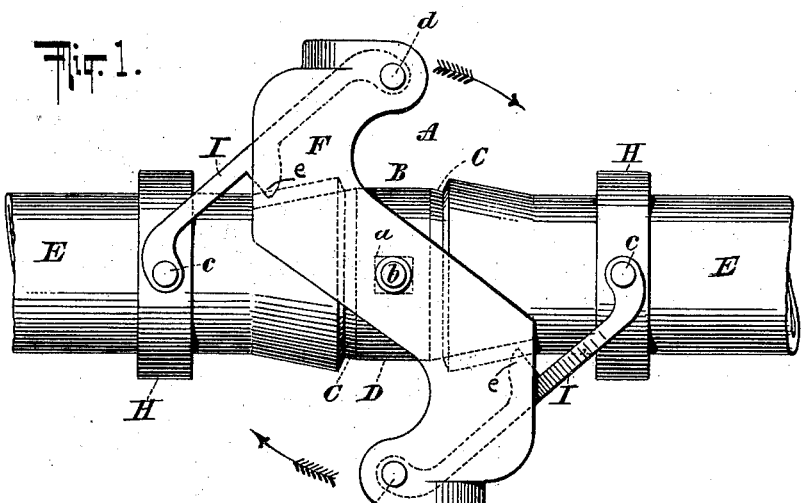
Figure 2:
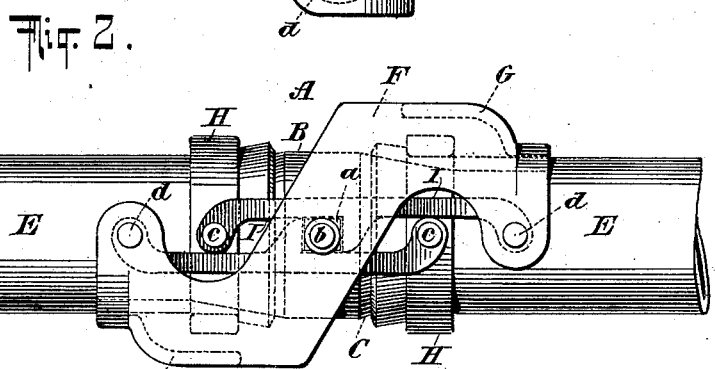
Figure 3:
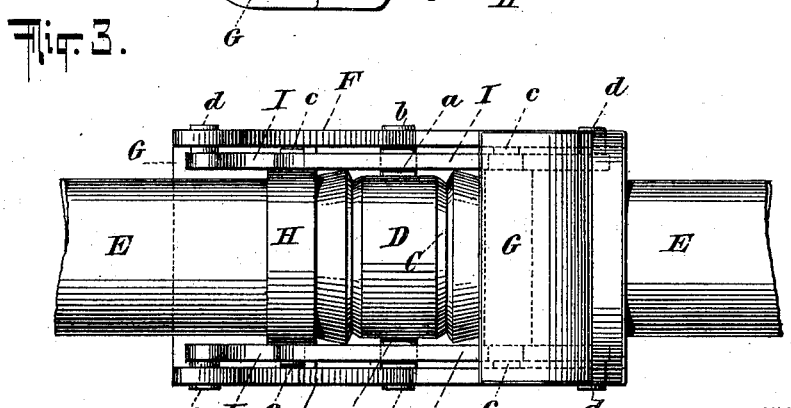

In the accompanying drawings, forming part of this specification, wherein like letters of reference indicate like parts, Figure 1 is a side view showing the opposing ends of a hose or pipe with a coupling made according to and embodying my invention ready to be secured thereto. Fig. 2 is a similar view showing the coupling with the ends of the hose or pipe duly secured together thereby, and Fig. 3 is a top view of the apparatus as seen in side view at Fig. 2.

In said drawings, A designates the coupling, comprising the sleeve B, having the tapering ends C C and the flat central portion D, intermediate said tapering ends, provided upon its opposite side with bosses $a$ $a$, said tapering ends C C being adapted to receive the opposing ends of the hose or pipe sections E E to be united. Upon the opposite sides of the sleeve B to the square bosses $a$ $a$ thereon is pivotally secured by rivets or screws $b$ $b$ the locking device, comprising the double levers F F, which are substantially S-shaped in out-
line and secured together near their outer ends by the connecting-sections G G.

H H denote annular clamps or collars, which are adapted to embrace the tapering ends C C of the sleeve B and the ends of the hose or pipe thereon, and I I denote links, the outer ends of which are pivotally secured to the outer opposite sides of the clamps or collars H H by screws or rivets $c$ $c$ and their inner ends similarly secured to the ends of the S-shaped levers F F upon the inner sides thereof by rivets or screws $d$ $d$, and $e$ $e$ denote toes provided on said links adapted to contact with the sides of the square bosses $a$ $a$, whereby to aid in holding the apparatus to its locked position.

The operation of the apparatus is as follows: The apparatus is first opened to about the position indicated at Fig. 1, and the opposing ends of the hose or pipe to be united are passed through the clamps or collars H H and then forced upon the tapering ends C C of the sleeve B to about the position indicated in the drawings. The clamps or collars H H are then pushed toward each other until the same are in position upon the tapering ends C C of the sleeve B, whereupon the locking device is forced downward in the direction of the arrow, Fig. 1, and the links I I caused to draw the clamps or collars H H farther inward and firmly clamp the ends of the hose or pipe upon the tapering ends of said sleeve B and lock said clamps or collars in position to effect a perfect union of the parts.

It is to be observed that inasmuch as the apparatus is a complete one requiring no assembling or setting together or calling for the use of any tools in order to apply the same it is particularly adapted for quickly and effectively uniting sections of hose or soft-metal pipe whenever it is desired to increase the length of said hose or pipe or repair a break therein.

Without limiting myself to the details of construction, which may be varied within the scope of the invention, what I claim, and desire to secure by Letters Patent, is—

1. A coupling comprising a sleeve adapted to receive the ends of pipe, annular clamps adapted to embrace the ends of the sleeve and the pipe thereon, and a lever pivotally connected to said sleeve and annular clamps for locking said annular clamps in position upon said sleeve, substantially as specified.

2. A coupling comprising a sleeve adapted to receive the ends of pipe, annular clamps adapted to embrace the ends of the sleeve and the pipe thereon, and a lever pivotally secured intermediate its ends to said sleeve and at its ends to the annular clamps and adapted to lock said annular clamps in position upon the ends of said sleeve, substantially as specified.

3. A coupling comprising a sleeve adapted to receive the ends of pipe, collars adapted to embrace the ends of the sleeve and the pipe thereon, a double lever pivotally secured to said sleeve, and links pivotally secured to said collars, and the ends of said double lever, substantially as specified.

4. A coupling comprising a sleeve having tapering ends adapted to receive the ends of pipe, collars adapted to embrace the tapering ends of the sleeve and the pipe thereon, a locking device comprising two lever members united together at their ends, and pivotally secured midway between their ends to the sleeve, and links pivotally secured to the ends of said lever members, and the collars, substantially as specified.

5. A coupling comprising a sleeve having tapering ends adapted to receive the ends of pipe, collars adapted to embrace the tapering ends of said sleeve and the pipe thereon, a locking device comprising two substantially S-shaped members united at their ends, and pivotally secured midway of their ends to said sleeve, and links having their ends pivotally secured to the ends of said S-shaped members and to the opposite surfaces of said collars, substantially as specified.

6. A coupling comprising a sleeve having tapering ends adapted to receive the ends of pipe, square bosses arranged upon the opposite sides of said sleeve intermediate its ends, collars adapted to embrace the tapering ends of said sleeve and the pipe thereon, a locking device comprising two substantially S-shaped members united at their ends and pivotally secured midway of their ends to the square bosses on said sleeve, and links having their ends pivotally secured to the ends of said S-shaped members and to the opposite sides of said collars and provided with toes adapted to contact with the sides of said square bosses, substantially as specified.

Signed at the city of New York, in the county and State of New York, this 8th day of April, 1902.

H. A. F. PETERSEN.

Witnesses:
CONRAD AUG. DIETERICH,
EDWIN H. DIETERICH.